Feb. 23, 1926.

S. H. WIGHTMAN ET AL

BLOCK SHAPING MACHINE

Filed Feb. 7, 1925     11 Sheets-Sheet 1

1,574,720

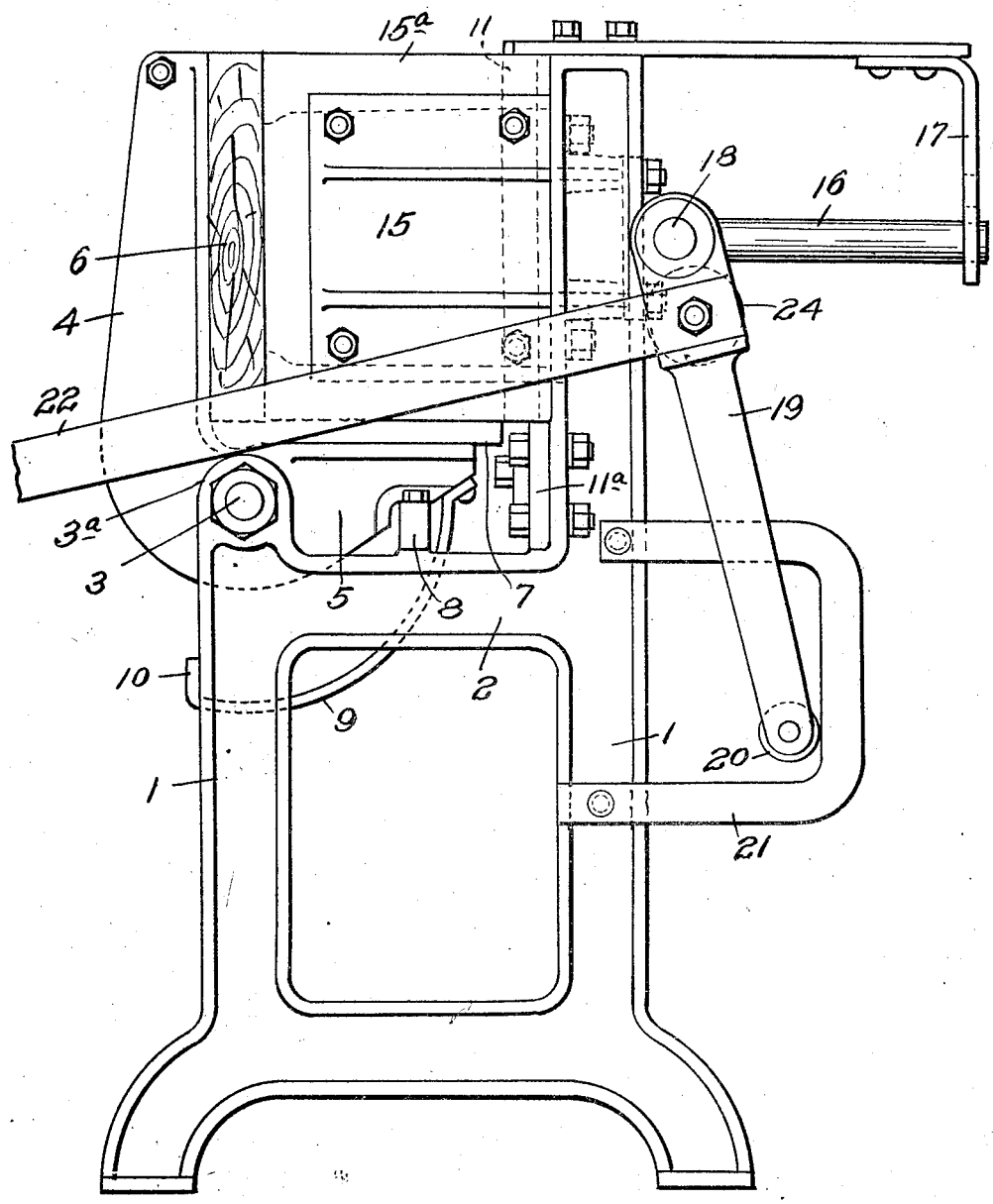

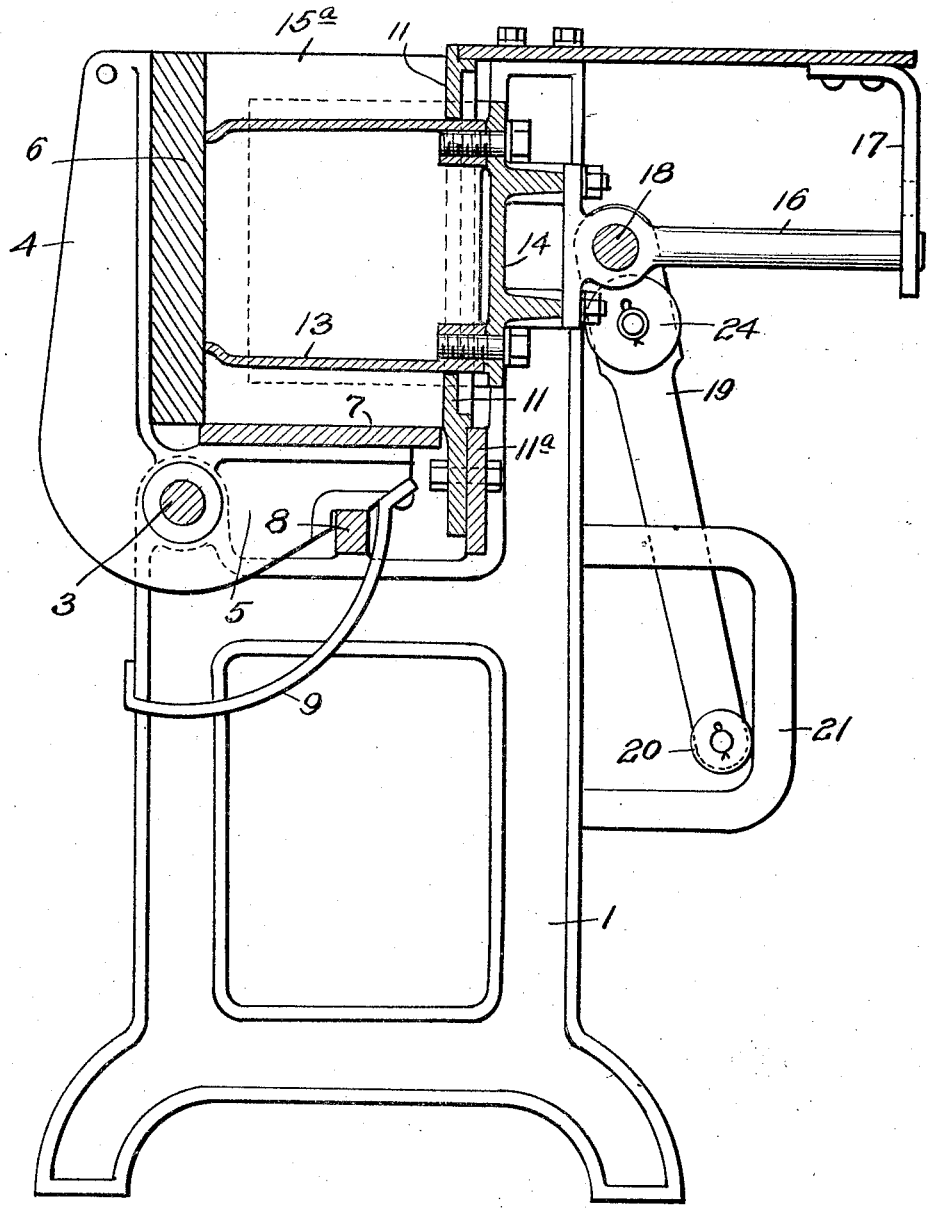

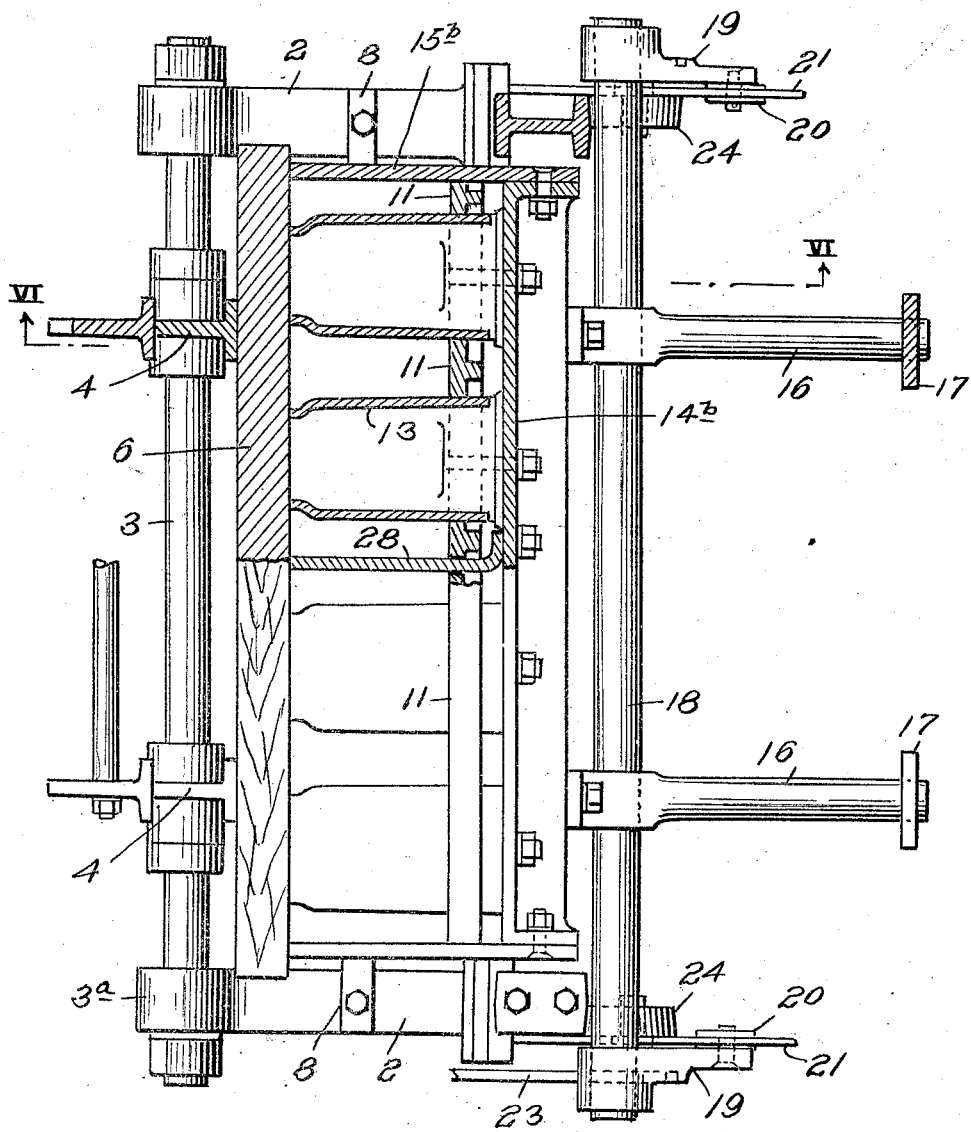

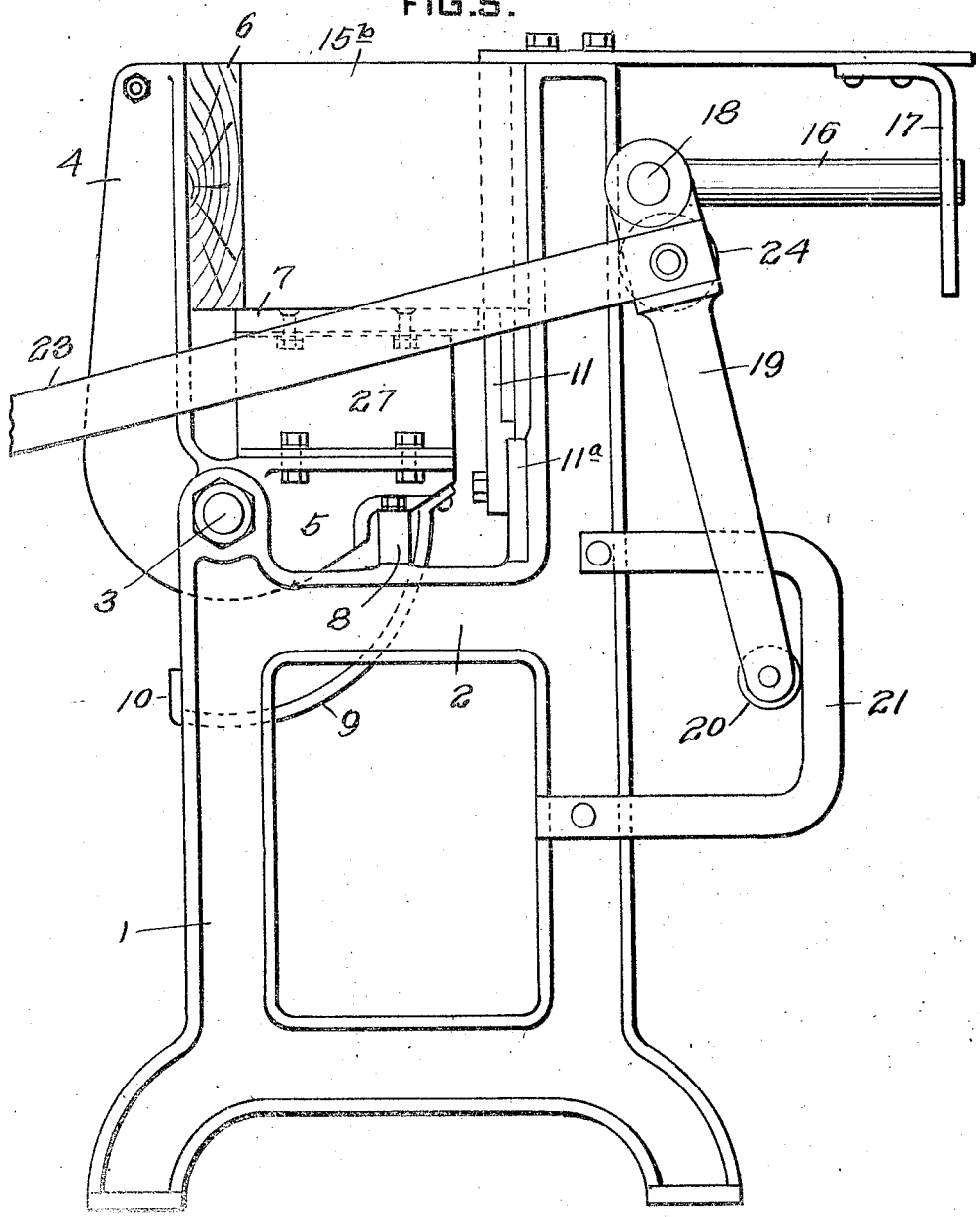

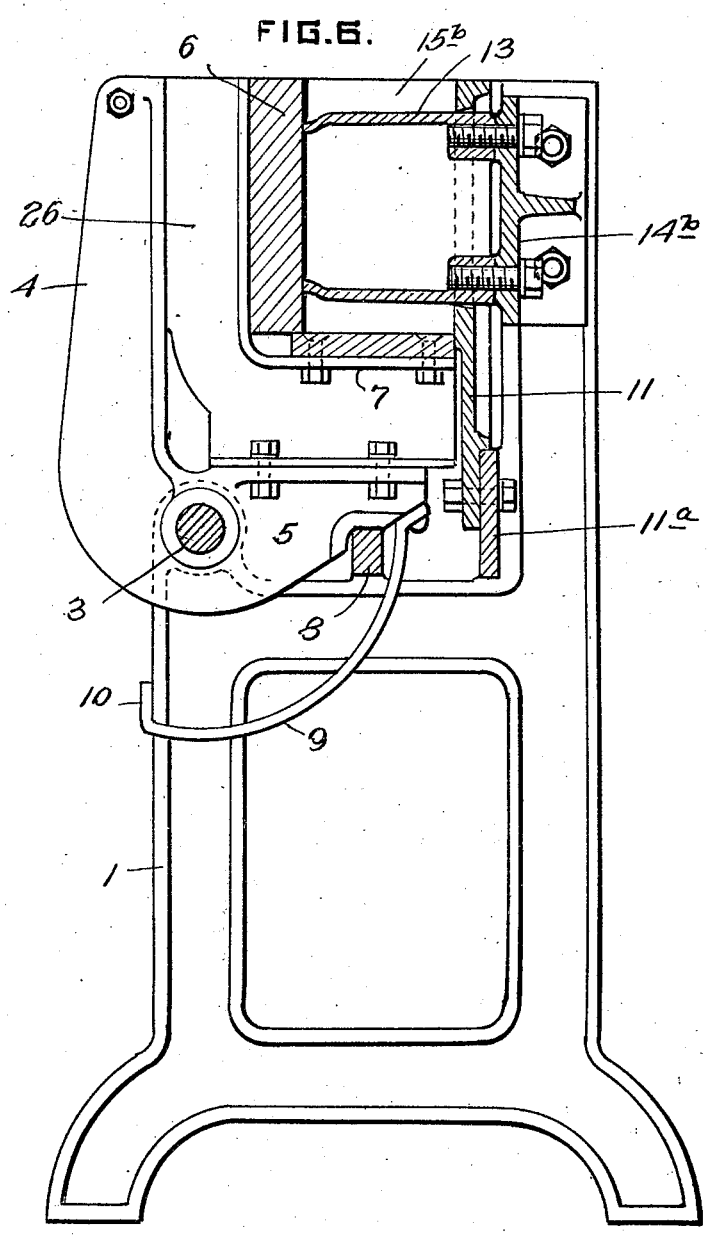

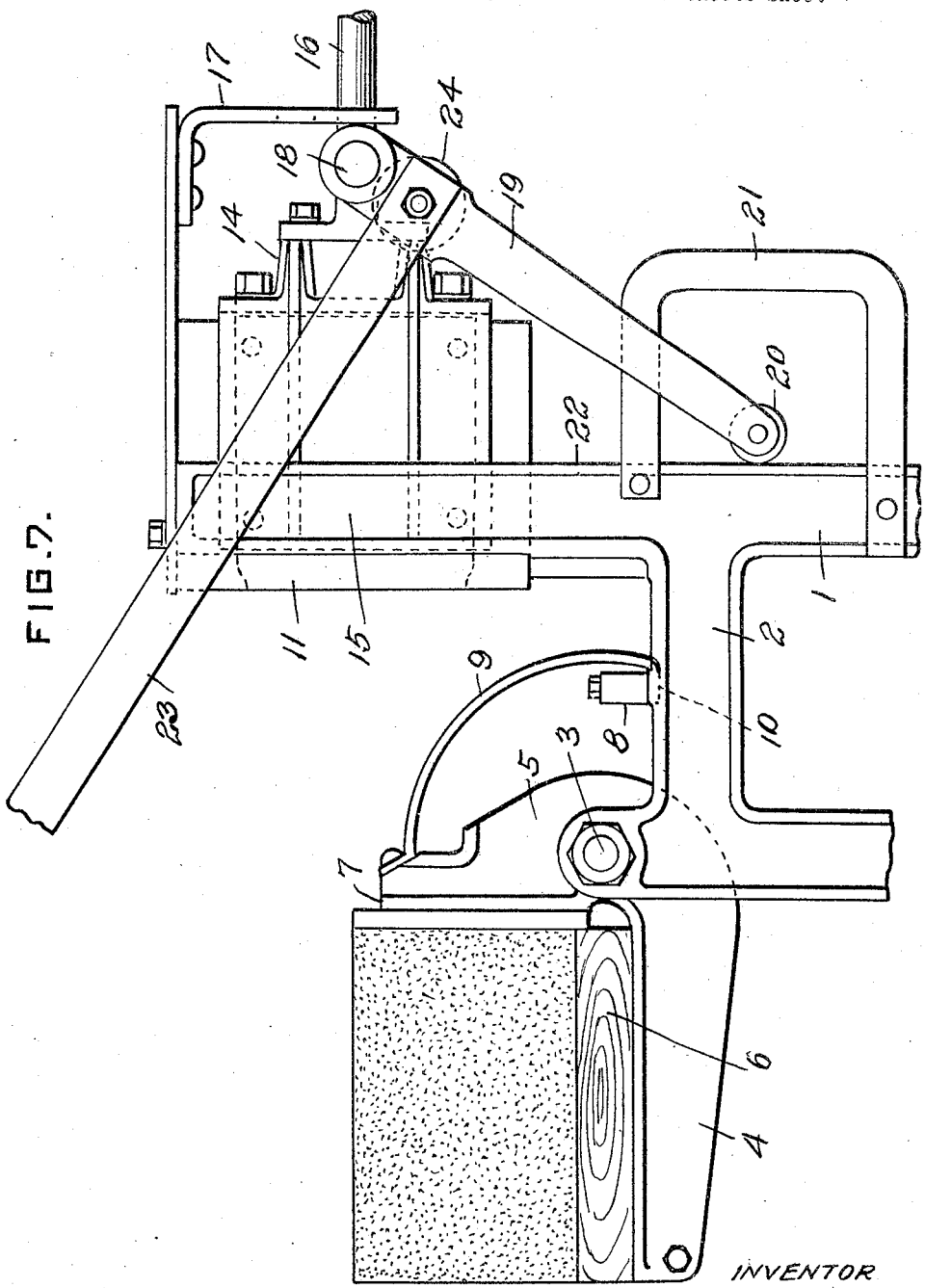

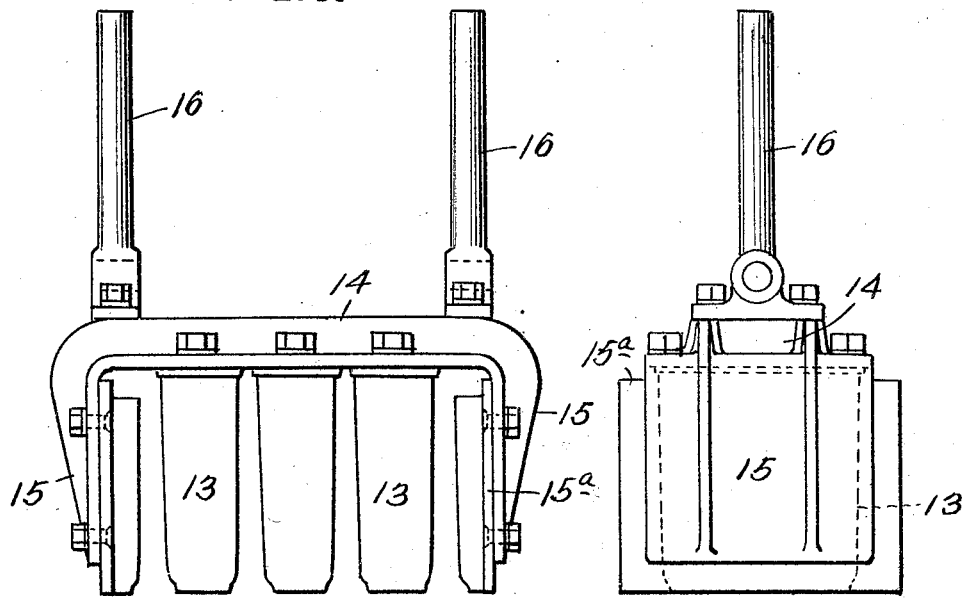
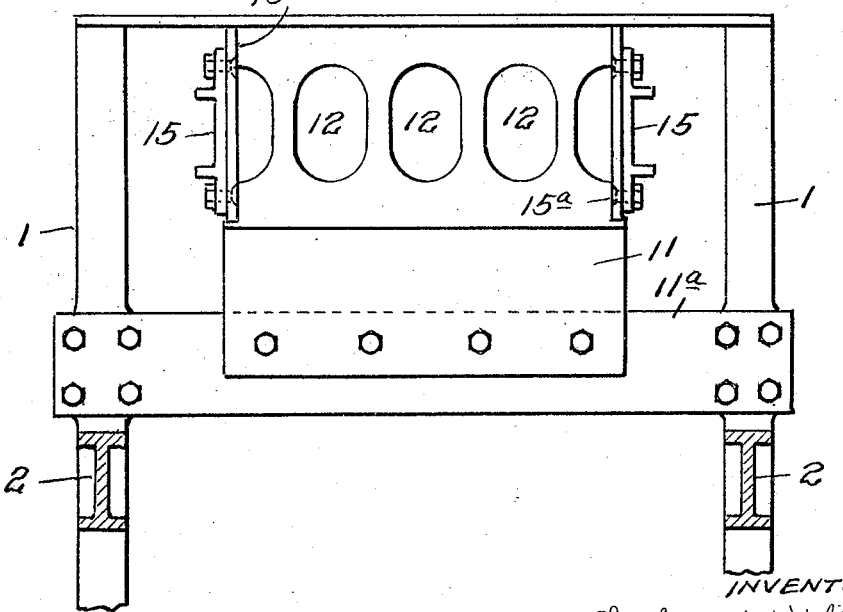

Feb. 23, 1926.

S. H. WIGHTMAN ET AL 1,574,720

BLOCK SHAPING MACHINE

Filed Feb. 7, 1925     11 Sheets-Sheet 9

WITNESS
J. Herbert Bradley.

INVENTOR
Sherbourn H. Wightman,
and Thomas A. Long
by Darwin S. Wolcott
atty

Feb. 23, 1926.
S. H. WIGHTMAN ET AL
1,574,720

BLOCK SHAPING MACHINE

Filed Feb. 7, 1925      11 Sheets-Sheet 10

WITNESS

INVENTOR

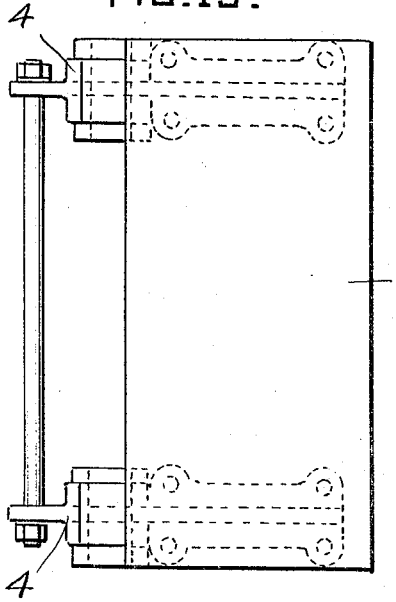
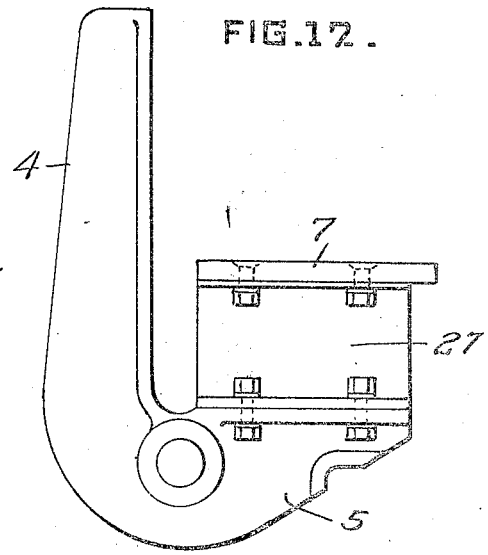
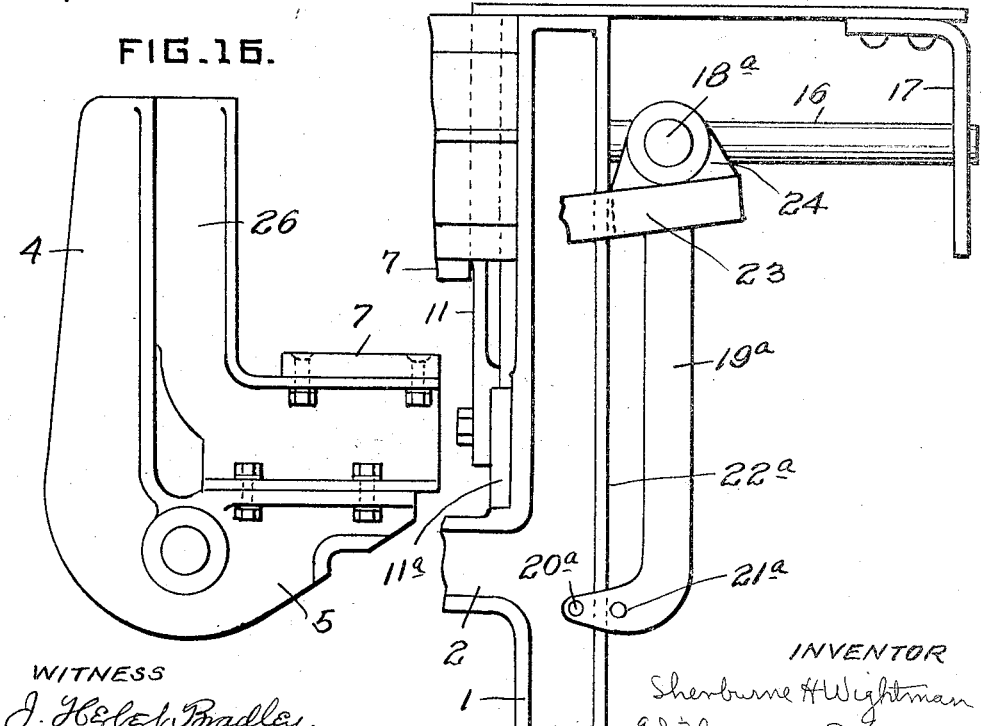

Patented Feb. 23, 1926.

1,574,720

UNITED STATES PATENT OFFICE.

SHERBURNE H. WIGHTMAN AND THOMAS A. LONG, OF CHICAGO, ILLINOIS, ASSIGNORS TO INTERNATIONAL CONCRETE INDUSTRIES CORPORATION, OF CHICAGO, ILLINOIS, A CORPORATION OF DELAWARE.

BLOCK-SHAPING MACHINE.

Application filed February 7, 1925. Serial No. 7,598.

*To all whom it may concern:*

Be it known that we, SHERBURNE H. WIGHTMAN and THOMAS A. LONG, residing at Chicago, in the county of Cook and State of Illinois, citizens of the United States, have invented or discovered certain new and useful Improvements in Block-Shaping Machines, of which improvements the following is a specification.

The invention described herein relates to certain improvements in molds, cores, and mold and core supporting and operating means for the manufacture of cement blocks, tiles, etc. The invention is hereinafter more fully described and claimed.

Figure 1:
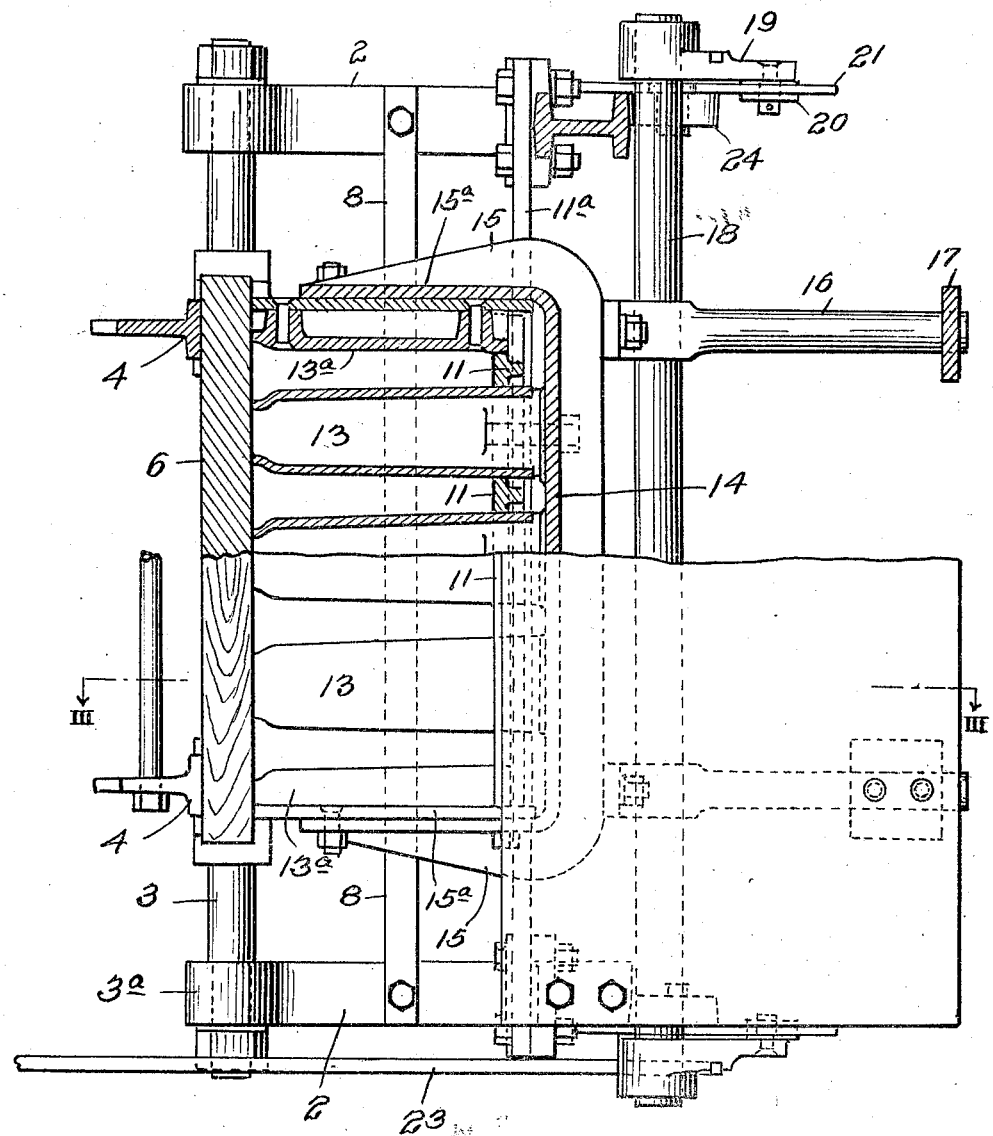
Figure 11:
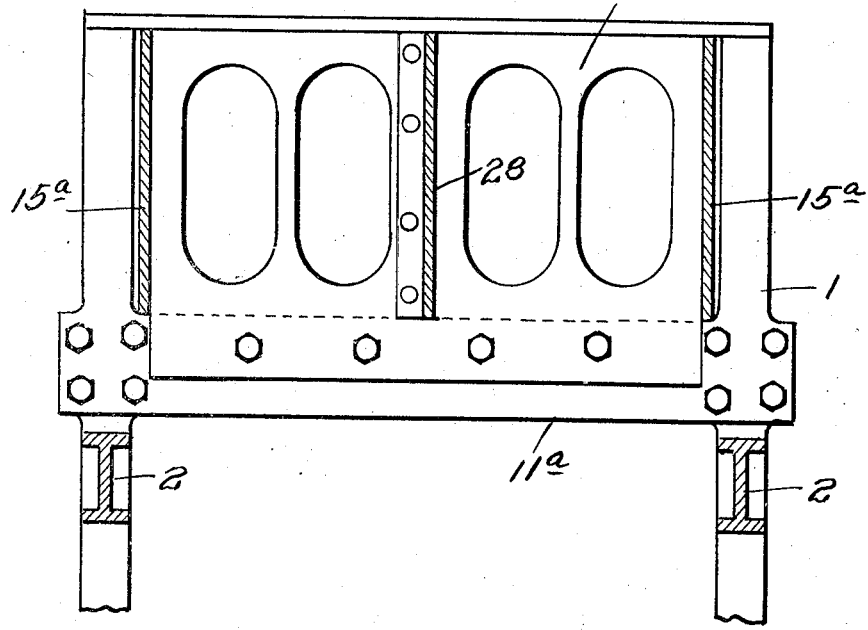
Figure 12:
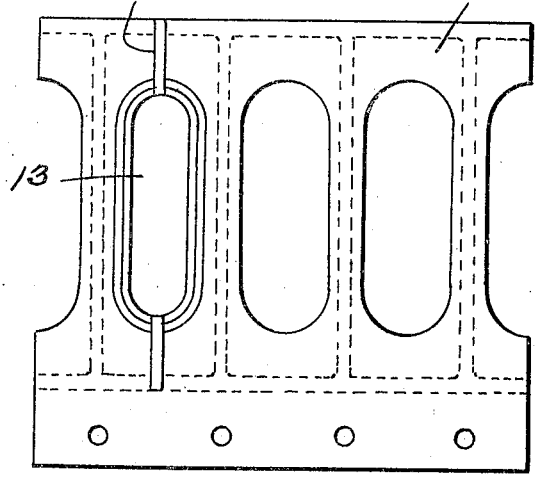
Figure 13:
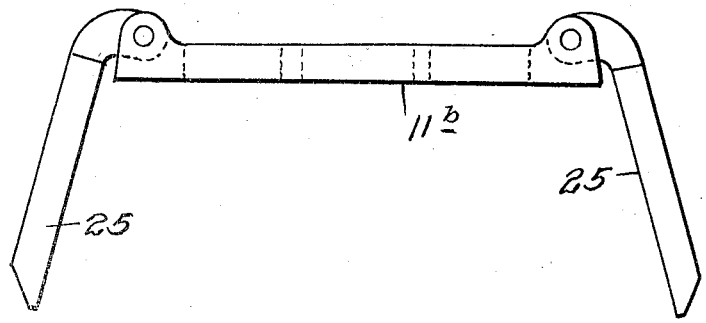
Figure 14:
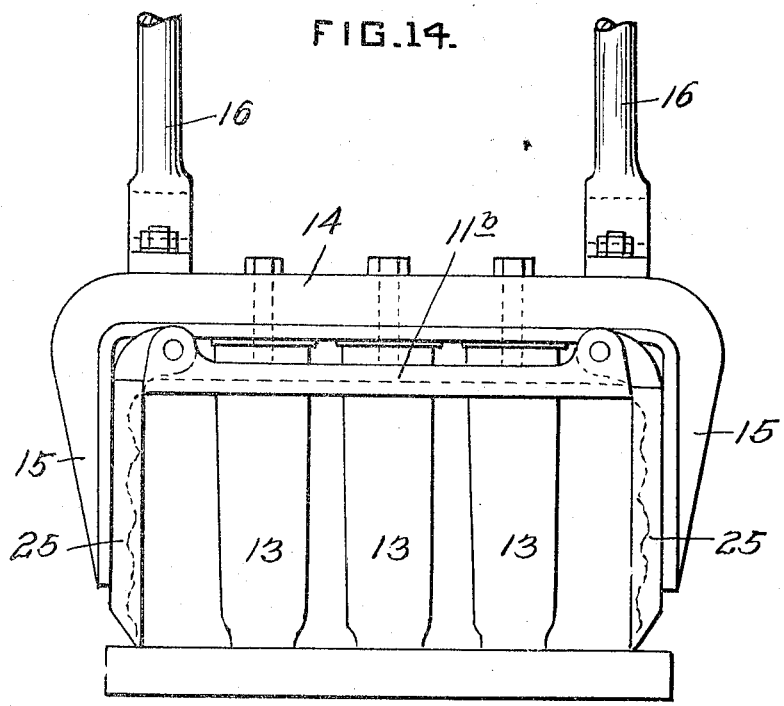

In the accompanying drawings forming a part of this specification Fig. 1 is a plan view partly in section of a construction embodying the improvement claimed herein; Fig. 2 is an end elevation of the same; Fig. 3 is a sectional elevation, the plane of section being indicated by the line III—III, Fig. 1; Figs. 4, 5 and 6 are views similar to Figs. 1, 2 and 3, illustrating a modification; Fig. 7 is an end elevation showing the cores withdrawn and mold open for removal of completed block; Figs. 8 and 9 show a core unit in plan and elevation; Fig. 10 is a sectional elevation illustrating a desirable manner of supporting the back plate of the mold; Fig. 11 is a view similar to Fig. 10 showing a construction of back plate for forming two units in the mold and a desirable manner of supporting a partition; Fig. 12 is an elevation of a back plate when it is desired to form a plurality of units having recessed ends; Fig. 13 is a detail view of a construction of back plate and end walls adapted for the manufacture of blocks or tiles having stone-finished ends; Fig. 14 is a view illustrating the operative position of the construction of the back and end plates shown in Fig. 13 and the core carrier; Fig. 15 is a top plan view of the mold cradle; Figs. 16 and 17 are end elevations of the cradle and filling pieces employed when it is desired to manufacture smaller blocks or tiles; and Fig. 18 is a detail view illustrating a modification of the means employed for shifting the cores.

In the practice of the invention the supporting frame consists of end members 1 spaced a distance apart by bars 2, the front edges of the end members being provided with bearings $3^a$ for the cradle shaft 3. On the shaft 3 are pivotally mounted the bell crank shaped members forming a cradle, the arms 4 of said members being adapted to laterally support a platen 6 while the arms 5 carry an anvil plate 7 during the tamping operation. When the cradle is turned to position for tamping, the arms 5 carrying the anvil plate rest upon a cross bar 8 having its ends secured to the cross-bars 2 of the frame. After a block or tile has been finished, the core unit is withdrawn and the cradle turned to discharge position, as shown in Fig. 7. Provision is made for limiting the movement of the cradle and holding it in discharge position until the platen with the completed block has been removed. Such cradle stop is preferably so constructed as to prevent material from lodging on the supporting bar 8 and consists of a plate 9 secured at one edge to the arms 5 of the cradle and so curved as to pass to the right of the bar 8 when the cradle is shifted as shown in Figs. 1 and 4, and provided with a lip 10 adapted to engage the bar 8 when the cradle is turned to discharge position.

In the type of molding machine shown herein the material is fed and the tamping is effected in directions at right angles to the axes of the cores, and hence the mold consists of three side and two end walls. Two of the side walls are formed by the platen and anvil plate and are carried by the cradle. The third side wall is formed by the back plate 11 and is removably attached to the bar $11^a$ having its ends secured to the end frames 1 of the machine, as shown in Figs. 3, 6, 10 and 11. While this back plate may extend the full length of the machine, i. e., from end frame to end frame, it is preferred that its length should be proportional to the length of a unit or combined lengths of the units formed at the same time, as will be seen by reference to Figs. 10 and 11. Through the back plate are formed openings 12 for the passage of the cores into the mold, said openings having such shape and dimensions relative to the transverse contour and dimensions of the cores that the back plate will guide the core unit and form lateral supports for the cores while in position in the mold.

In the construction shown in Figs. 1, 2, 3, 8 and 9 the cores 13 are secured to a horizontally reciprocable member consisting of a head 14 provided with forwardly projecting arms 15 integral with the member 14. To these arms are secured plates $15^a$ adapted to form the end walls of the mold. In lieu of the construction shown in Figs. 8 and 9, plates $15^b$ adapted to form the end walls of the mold may be secured directly to a head $14^b$ as shown in Figs. 4, 5 and 6. The reciprocable head or member 14 or $14^b$ is secured to the front ends of the supporting and reciprocable rods 16 which are supported adjacent to their outer ends by hangers 17 secured to the frame of the machine. While any suitable means may be employed for reciprocating the rods and head or member 14, it is preferred to employ the construction shown in Figs. 1 to 7. This construction consists of a shaft 18 passing through openings in the rods 16 and levers 19 secured at their upper ends to the shaft 18. The levers are provided with portions, as for example, rollers 20, projecting in between two spaced surfaces, one of which in the construction shown is formed by a vertical portion of the frame of the machine and the other by the outer end of a loop 21. When the operating handle 23 is raised, the rollers 20 will move into contact with the frame of the machine so that the continued movement of the handle will force the rods and head 14 and cores outwardly. When the handle is depressed, the lower ends of the levers will swing outwardly until the rollers 20 bear against the outer ends of the loops 21, and thereafter the rods, head, and cores, will be moved inwardly. As there will be considerable resistance to the outward movement of the head and cores due to the adherence of the cement to the surfaces of the cores, auxiliary means are employed for starting the outward movements of the cores. A suitable construction to that end consists in so mounting rollers 24 on the levers 19 that when the cores are in position in the mold, these rollers will bear on the frame of the machine. When the handle is raised, and while the lower ends of the levers are moving towards the frame of the machine, the levers will fulcrum on the rollers 24, but as soon as the rollers 20 bear on the frame of the machine, they will operate as the fulcra of the levers. In lieu of the construction shown in Figs. 1 to 7, that shown in Fig. 18 may be employed. As shown in Fig. 18 a shaft $18^a$ is passed through openings in the rods 16 and fulcrumed levers $19^a$ are secured at their upper ends to the shaft $18^a$. These levers are provided at their lower ends with fulcrum pins $20^a$ and $21^a$ adapted to bear on opposite sides of the vertical strips $22^a$ preferably consisting of ribs formed integral with the end 1 of the frame of the machine. As the operating handle 23 is raised, the levers $19^a$ will pivot on the pin $21^a$ and the rods 16 and the head will move outwardly, the lower ends of the levers moving upwardly. When the handle is moved down, the pin $20^a$ will bear on the strip or flange $22^a$ so that the rods 16 and the head will be forced inwardly, the lower ends of the levers moving downwardly.

In lieu of the construction shown in Figs. 1 to 7, to effect the initial outward movement of the cores, that shown in Fig. 18 may be employed and consists of cam plates $24^a$ secured to the shaft $18^a$. The cams are so secured to the shaft 18 as to bear on the frame of the machine when the cores are in position in the mold, and have such eccentricity that as the handle 23 is raised the cores will be given a sufficient movement as to break the adherence of the material of the block to the cores. Further and complete outward movement of the cores will be effected by the pivotal movement of the levers $19^a$ on a fulcrum formed by the pin $21^a$.

In the construction shown in Figs. 1 to 10, the plates forming the end walls of the mold are withdrawn by the heads, but when it is desired to produce what is known as roughened or rock faces on the ends of the article, the plates forming the ends of the mold cannot be slid along in contact with the ends of the block, but must be shifted away from the ends of the block. When such articles are to be formed, plates 25 are pivotally connected to the back plate $11^b$ as shown in Figs. 13 and 14, and are held in position by the arms 15 on the head. After the head and cores are withdrawn, the plates 25 are pulled away from the block and the cradle turned down, carrying the block from between the plates 25.

The angular parts 4 and 5 forming the frame of the cradle are preferably spaced such a distance on the shaft 3 as to support the platen and anvil plate of the shortest article to be formed, and the arms of the frames are made of lengths sufficient to support the platen and anvil plate of the widest article to be shaped in the machine, and when it is desired to make transversely smaller articles, filling pieces are interposed between the arms of the cradle and the platen or anvil plate or both. As for example, in Fig. 6 provision is made for making an article of reduced depth and width by interposition of angular blocks 26 between the arms of the cradle and the platen and anvil, such construction being also shown in Fig. 16. But when it is desired to form an article reduced in one dimension, as depth, blocks 27 are arranged on the arms 5 of the cradle, as shown in Figs. 5 and 17.

The construction indicated in Figs. 1 and 10 is adapted to form a single unit having three cored openings. The anvil 7 is made of a suitable length to properly support the end plates a distance apart equal to the desired length of the article, and a back plate 11 having openings located vertically and horizontally corresponding to the positions of the cores, is secured to the longitudinal bar 11$^a$ as shown in Fig. 10. When it is desired to make longer articles or a number of units at one operation, a head 14 of correspondingly increased length and a longer back plate 11 as indicated in Figs. 4 and 11, are placed in the machine. When it is desired to form a plurality of units, one or more partition plates 28 are secured to the back plate 11 as shown in Figs. 4 and 11, or if it is desired to form at the same time a plurality of blocks, the cores are provided with ribs 29 as shown in Fig. 13, the back plate being suitably slotted.

When making articles of reduced width by the employment of filling pieces, as described, a core unit, i. e., a head having cores secured thereto, of corresponding vertical width, is employed, and the position of the head and cores is correspondingly adjusted. To permit of this vertical adjustment, the hangers 17 are provided with a plurality of openings for the reception of the supporting bars 16 as shown in Figs. 1, 2 and 7.

A characteristic feature of the invention shown herein is the unit consisting of a head 14, cores and forwardly extended members at the ends of the head. These members may have the end walls of the mold secured thereto or may form the end walls of the mold, which when a unit is placed in a machine, will rest on the anvil plate. The cores project through the openings in the back plate, the latter guiding the unit longitudinally. This unit has combined therewith means operating with parts of the frame of the machine which effect the reciprocation of the unit. The lever 19 has in effect two fulcra, one adjacent to its upper end and formed by the roller or cam and the other adjacent to its lower end.

In practice a number of heads, cores and plates dependent on the different lengths and transverse dimensions of articles to be formed, are provided. In addition to the head, cores, and plates, the unit includes the means for shifting the head, said means including the rods 16, the shaft 18 mounted on the rods and levers 19. The only elements involved in shifting the head, and not included in the core unit, are the respective surfaces against which the lower ends of the levers 19 bear in shifting the head. The loop 21 is so proportioned that its outer end will serve as a bearing for the lever for all sizes, i. e., vertical widths of heads employed for any one machine.

In case the machine has been operating to make the maximum standard size and it is desired to make blocks of less length but without changing the transverse dimensions, another head may be substituted having cores arranged in proper relation for such shorter unit, and another back plate having openings therethrough corresponding to the relative positions of the cores in the new head. As no change in transverse dimensions is desired, the new head will have the same vertical position in the machine as that removed. The vertical positions of the heads are determined by the anvil plates 7 on which the lower edges of the side plates 15$^a$ rest during the formation of the block. When it is desired to make blocks or tiles of a reduced width, filling blocks 28 are placed in the arms 5 of the cradle and a suitable anvil plate placed thereon. The core unit and back plate previously used are removed and suitable back plate and core unit are placed in the machine. As the anvil is supported at a higher level, it is evident that a vertically shorter head must be used.

In case it is desired to make blocks of reduced width and height, an angular filling block 26 is arranged in the cradle, as shown in Figs. 6 and 16, and a shorter head having suitably constructed and arranged cores and end plates is placed in the machine. When it is desired to make blocks of reduced height, filling blocks are placed against the arms of the cradle to support the platen horizontally and a core unit having correspondingly shorter cores is placed in the machine. It will be understood that as the platen is held in position against the arms 4 of the cradle or against a filling block, the cores are made of lengths varying in accordance with the height of the blocks to be formed. It will be understood that whenever a core unit is changed to make different sizes of blocks, a back plate having holes or openings corresponding to the positions of the cores on the new head must be placed in the machine. In short, a core unit and a back plate with properly arranged holes form a set.

It will be readily understood that the machine can be quickly and easily fitted to make a large variety of blocks or tiles.

We claim herein as our invention:

1. A block or tile shaping machine having in combination a cradle adapted to support a platen and an anvil at an angle one to the other, a back plate forming the third side of a mold, a horizontally reciprocable head, plates adapted to form the end walls of the mold and held in operative position by the head, cores carried by the head and means for reciprocating the head.

2. A block or tile shaping machine having in combination pairs of arms arranged at an angle one to the other and adapted to support platens and anvils varying in longitudinal dimensions and forming two sides of a mold, a plurality of back plates adapted to form the third side of molds, and having openings for the passage of cores into the mold, and a plurality of units each consisting of a head, cores and plates adapted to form the end walls of molds, and means for reciprocating the head.

3. A block or tile shaping mechanism having in combination a plurality of series of interchangeable wall members for the formation of molds varying in dimensions, and a series of interchangeable units each unit consisting of a head, plates spaced in accordance with the length of block to be formed and cores, the walls employed for forming a side of the mold having openings for the insertion of the cores into the mold.

4. A block or tile shaping mechanism having in combination a mold having a removable wall having openings therethrough for the insertion of cores, and a removable and reciprocable unit consisting of a head, cores, means for supporting end walls of the mold, and means for operating said unit.

5. A block or tile shaping mechanism having in combination a mold having openings in one of the walls for the movement of cores into and out of the mold, and a reciprocable unit consisting of a head, cores, means for supporting walls at opposite ends of the wall having core openings, and means cooperating with a portion of the frame of the machine for shifting the unit.

6. A block or tile shaping mechanism having in combination a mold having openings in one of the walls for the movement of cores into and out of the mold, and a removable and reciprocating unit consisting of a head, cores, means for supporting walls at opposite ends of the wall having core openings, and means cooperating with a portion of the frame of the machine for shifting the unit.

7. A removable unit for a block or tile shaping machine comprising a head having at its ends forwardly extended members, cores secured to the head at points intermediate the forwardly extended members and means adapted to cooperate with the frame of a shaping machine, to reciprocate the unit.

8. A removable unit for a block or tile shaping machine comprising a head having at its ends forwardly extended members, cores secured to the head at points intermediate the forwardly extended members and means adapted to cooperate with the frame of a shaping machine to reciprocate the unit, said unit being adapted to be supported and guided when placed in a machine by walls of the mold.

9. A unit for a block or tile shaping machine comprising a head having forwardly extended members, cores secured to the head intermediate said members, a lever pivotally connected to the head and having a portion adapted to bear on the frame of the machine when the unit is placed in the machine and form a fulcrum for the lever and means for shifting the lever.

10. A unit for a block or tile shaping machine comprising a head having forwardly extended members, cores secured to the head intermediate said members, rods secured to the head, a shaft carried by said rods, levers connected at one end to the rods and provided with portions spaced at different distances from the shaft and adapted to bear on portions of the frame of a machine when the unit is placed in position in the machine and means for shifting the said levers.

11. In a machine for shaping blocks, tiles, etc., having in combination a mold having openings in one of its side walls, a head provided with forwardly extended members, cores secured to the head intermediate the forwardly extended members, rearwardly extending rods connected to the head, a shaft carried by said rods, levers having their upper ends connected to the shaft, a roller mounted on the levers adjacent to the shaft and adapted to bear on a portion of the machine and form fulcra for the levers the lower end of the levers being adapted to project between spaced portions of the frame of the machine.

12. A unit for a block or tile shaping machine comprising a head, cores secured to the head, a lever pivotally connected to the head, and having portions spaced at different distances from the pivotal point of the lever and adapted to operate in succession as fulcrums when the lever is shifted, and means for shifting the lever.

13. A block or tile shaping machine having in combination a mold having openings in one of its walls for the movement of cores into and out of the molds, a reciprocable head, cores carried by said head, a lever pivotally connected to the head having portions, one adapted to serve as a fulcrum when the lever is shifted to move the head in one direction and another adapted to serve as a fulcrum when the lever is shifted to move the head in the opposite direction and means for shifting the lever.

14. A block or tile shaping machine having in combination a mold having openings in one side for the movement of cores into and out of the mold, a reciprocable head, cores carried by the head, a lever pivotally mounted on the head, and having three portions adapted to bear on the frame of the machine and serve as fulcrums when the lever is shifted to move the head, and means for shifting the lever.

In testimony whereof we have hereunto set our hands.

S. H. WIGHTMAN.
THOMAS A. LONG.